S. WOINA.
CULINARY BOILER.
APPLICATION FILED NOV. 25, 1916.

1,218,823.

Patented Mar. 13, 1917.

Inventor
S. Woina.

By A. M. Wilson
Attorney

UNITED STATES PATENT OFFICE.

SYLVESTER WOINA, OF LOST CREEK, WEST VIRGINIA.

CULINARY BOILER.

1,218,823. Specification of Letters Patent. Patented Mar. 13, 1917.

Application filed November 25, 1916. Serial No. 133,359.

*To all whom it may concern:*

Be it known that I, SYLVESTER WOINA, a subject of the Czar of Russia, residing at Lost Creek, in the county of Harrison and State of West Virginia, have invented certain new and useful Improvements in Culinary Boilers, of which the following is a specification.

This invention relates to certain new and useful improvements in culinary boilers.

The primary object of the invention is the provision of a boiler adapted for cooking vegetables and other articles as well as for boiling milk, the arrangement being such that the device presents the appearance of two ordinary separate receptacles when not desired for coöperative use.

A further object of the device is the provision of a double boiler having an ordinary receptacle for the inner container while the outer receptacle is arranged with disappearing supporting means for the inner receptacle.

A still further object of the device is the provision of a double boiler that is easy and inexpensive to manufacture and in which the two boilers are designed for individual use in the ordinary manner when desired but are readily made serviceable in connection with each other as a double boiler.

In the drawing forming a part of this application and in which like designating characters refer to corresponding parts throughout the several views:—

Figure 1:
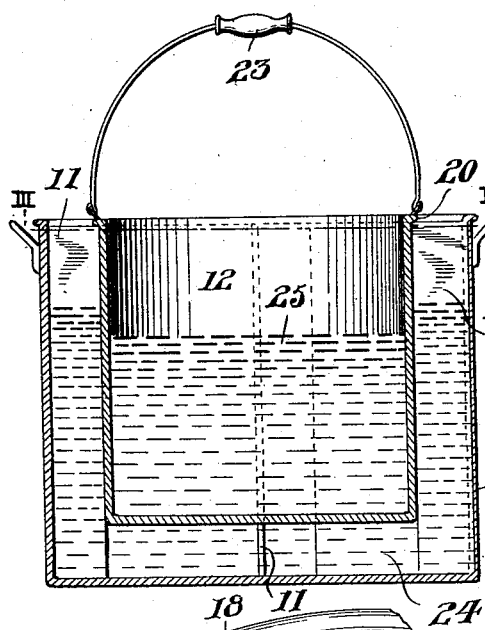
Figure 1 is a central longitudinal sectional view of the device.
Figure 2:
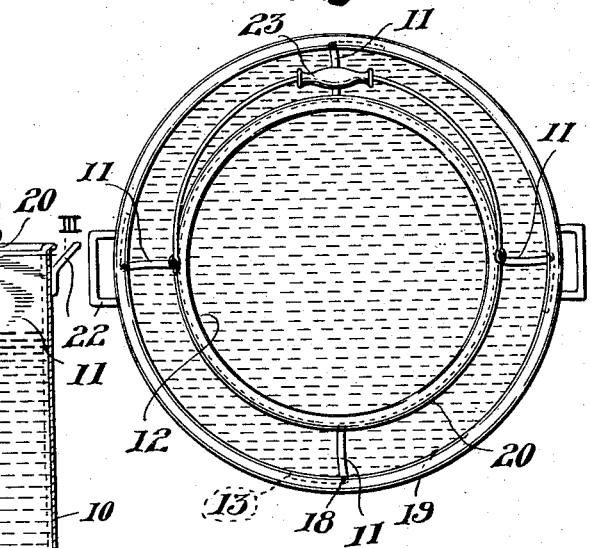
Fig. 2 is a top plan view thereof.
Figure 3:
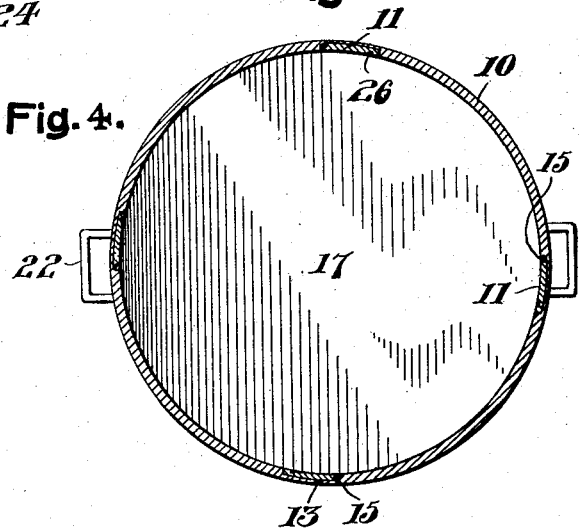
Fig. 3 is a horizontal sectional view upon the line III—III of Fig. 1, taken through the outer receptacle with the supporting members closed and the inner receptacle removed, and, Fig. 4 is a perspective view of a side portion of the interior of the outer receptacle illustrating one of the supporting members operatively positioned.
Figure 4:
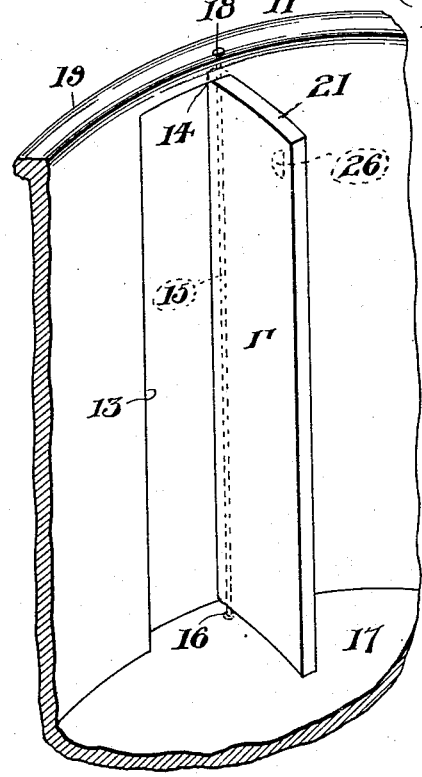

The present invention broadly consists in an outer receptacle or kettle 10 provided with a plurality of swinging wings 11 adapted for supporting a relatively smaller kettle or receptacle 12 thereon positioned centrally of the larger kettle 10. The kettle 10 has its side wall provided with longitudinally-extending recesses 13 in which the outer curved edges 14 of the wings 11 are hinged by means of rods 15, the said wings 11 being of slightly arcuate form adapted for closely seating within the recesses 13 when closed for providing a substantially uninterrupted inner surface for the kettle 10. The rod 15 of each wing 11 has its lower end seated in a socket 16 in the bottom 17 of the kettle 10 and extends longitudinally through the wing terminating in a head as at 18 upon the marginal bead 19 of the kettle.

The smaller kettle 12 is provided with an outwardly projecting annular bead 20 at the top thereof, the diameter of the kettle 12 being such as to permit its insertion within the kettle 10 between the wings 11 when the said wings are opened and positioned substantialy radially of the kettle 10, the bead 20 of the inner kettle 12 being adapted to rest upon the upper faces 21 of the wings.

In this position, the top beads 19 and 20 of the two kettles 10 and 12 respectively, are positioned in substantially the same plane when the two kettles are employed as a double boiler. The outer kettle is provided with oppositely projecting handles 22 while the inner kettle 12 has a bail handle 23. It will be evident that by providing water such as 24 in the outer kettle 10, the boiling of such water will heat the inner kettle 12 and the contents thereof such as milk 25. Upon removing the inner kettle 12, the wings 11 may be readily closed and the outer kettle 10 employed as an ordinary kettle. A finger hold 26 is provided in the outer face of each of the wings 11 whereby the wings are readily opened when desired.

What I claim as new is:—

1. A double boiler comprising an outer and an inner container, the outer container having recesses in the inner face of the side wall, supporting means for the inner container hingedly mounted upon the inner face of the side wall of the outer container and seated in said recesses to lie flush with the inner face of the side wall of the outer container when not in use.

2. A boiler comprising a kettle having recesses in the inner face of its side wall, longitudinally arranged supporting wings hinged within the said recesses adapted for seating within the latter flush with the adjacent face of the wall when closed, the said supporting wings being arranged substantially radially of the kettle when operatively positioned in their open arrangement, and an inner container arranged in said kettle and held centrally positioned by said wings.

3. A boiler comprising a kettle having recesses in the inner face of its side wall, diametrically opposed vertically arranged supporting wings hinged within the said recesses adapted for seating within the latter flush with the adjacent face of the wall when closed, the said supporting wings being arranged substantially radially of the kettle when operatively positioned in their open arrangement, an inner receptacle of relatively less dimensions than the said kettle being of substantially the same diameter as the distance between the inner edges of the said wings when opened and an outwardly projecting annular bead upon the said receptacle adapted for seating upon the upper faces of the said wings when the receptacle is axially positioned within the kettle with the wings in their open arrangement.

In testimony whereof I affix my signature.

SYLVESTER WOINA.

Copies of this patent may be obtained for five cents each, by addressing the "Commissioner of Patents, Washington, D. C."